US008803358B2

(12) United States Patent
Häfner et al.

(10) Patent No.: US 8,803,358 B2
(45) Date of Patent: Aug. 12, 2014

(54) HVDC SWITCHYARD AND AN HVDC SWITCHYARD SYSTEM

(75) Inventors: Jürgen Häfner, Ludvika (SE); Björn Jacobson, Grängesberg (SE); Tomas Jonsson, Västerås (SE); Kerstin Lindén, Ludvika (SE); Bertil Berggren, Västerås (SE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/807,618

(22) PCT Filed: Jun. 30, 2011

(86) PCT No.: PCT/EP2011/061044
§ 371 (c)(1),
(2), (4) Date: Dec. 28, 2012

(87) PCT Pub. No.: WO2012/001123
PCT Pub. Date: Jan. 5, 2012

(65) Prior Publication Data
US 2013/0106184 A1 May 2, 2013

(30) Foreign Application Priority Data

Jun. 30, 2010 (WO) .................. PCT/EP2010/059272

(51) Int. Cl.
*H02J 1/10* (2006.01)
*H02H 7/26* (2006.01)
*H02J 1/00* (2006.01)
*H01H 33/59* (2006.01)
*H02H 7/125* (2006.01)

(52) U.S. Cl.
CPC *H02J 1/00* (2013.01); *H02H 7/268* (2013.01); *H01H 33/596* (2013.01); *H02H 7/1257* (2013.01)

USPC .................. 307/29; 307/86; 307/19; 307/23; 307/31; 307/113; 363/35; 363/51; 361/4; 361/6; 361/8

(58) Field of Classification Search
CPC ..................................... H01J 1/00; H02H 1/00
USPC ............................................................ 307/29
See application file for complete search history.

(56) References Cited

U.S. PATENT DOCUMENTS 3,543,045 A   11/1970 Hammarlund et al.
5,517,378 A *  5/1996 Asplund et al. .................. 361/4
(Continued)

FOREIGN PATENT DOCUMENTS

EP   0 867 998 A1   9/1998

OTHER PUBLICATIONS

IEEE Transaction on Power Delivery, vol. 21, No. 2. Apr. 2006. pp. 646-651. A DC Hybrid Circuit Breaker With Ultra-Fast Contact Opening and Integrated Gate-Commutated Thyristors (IGCTs) Jean-Marc Meyer and Alfred Rufer.*

(Continued)

*Primary Examiner* — Rexford Barnie
*Assistant Examiner* — Toan Vu
(74) *Attorney, Agent, or Firm* — Birch, Stewart, Kolasch & Birch, LLP

(57) ABSTRACT

The present invention relates to an HVDC switchyard arranged to interconnect a first part of a DC grid with a second part of the DC grid. By means of the invention, a first part of the DC grid is connected to the busbars of the HVDC switchyard via a fast DC breaker, while further part(s) of the DC grid are connected to the busbars of the HVDC switchyard by means of switchyard DC breakers of lower breaking speed. By use of the inventive HVDC switchyard arrangement, the cost for the HVDC switchyard can be considerably reduced, while adequate protection can be provided. In one embodiment, the fast DC breaker is an HVDC station DC breaker forming part of an HVDC station. In another embodiment, the fast DC breaker is a switchyard DC breaker.

21 Claims, 6 Drawing Sheets

(56) References Cited

U.S. PATENT DOCUMENTS

| | | | |
|---|---|---|---|
| 2009/0168468 A1* | 7/2009 | Radbrant et al. | 363/35 |
| 2011/0115308 A1* | 5/2011 | Wang et al. | 307/125 |
| 2012/0199558 A1* | 8/2012 | Faulkner | 218/143 |
| 2012/0267955 A1* | 10/2012 | Zhan et al. | 307/31 |

OTHER PUBLICATIONS

Tang, et al., "Locating and Isolating DC Faults in Multi-Terminal DC Systems", IEEE Transactions on Power Delivery, vol. 22, No. 3, Jul. 2007, pp. 1877-1884.

Tang, et al., "Protection of VSC-Multi-Terminal HVDC Against DC Faults", IEEE, vol. 2, Jun. 23, 2002, pp. 719-724.

\* cited by examiner

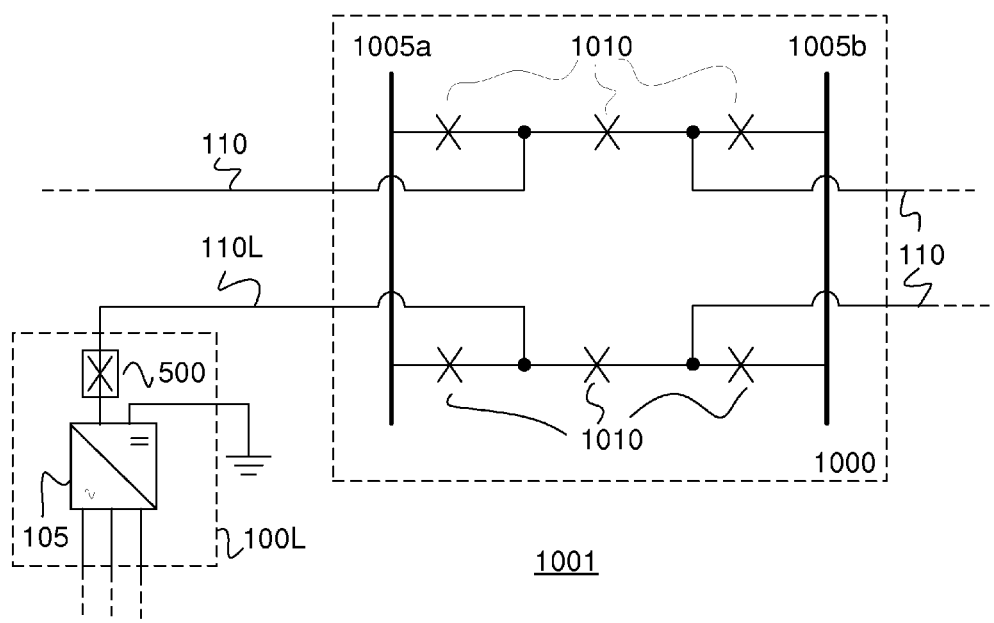
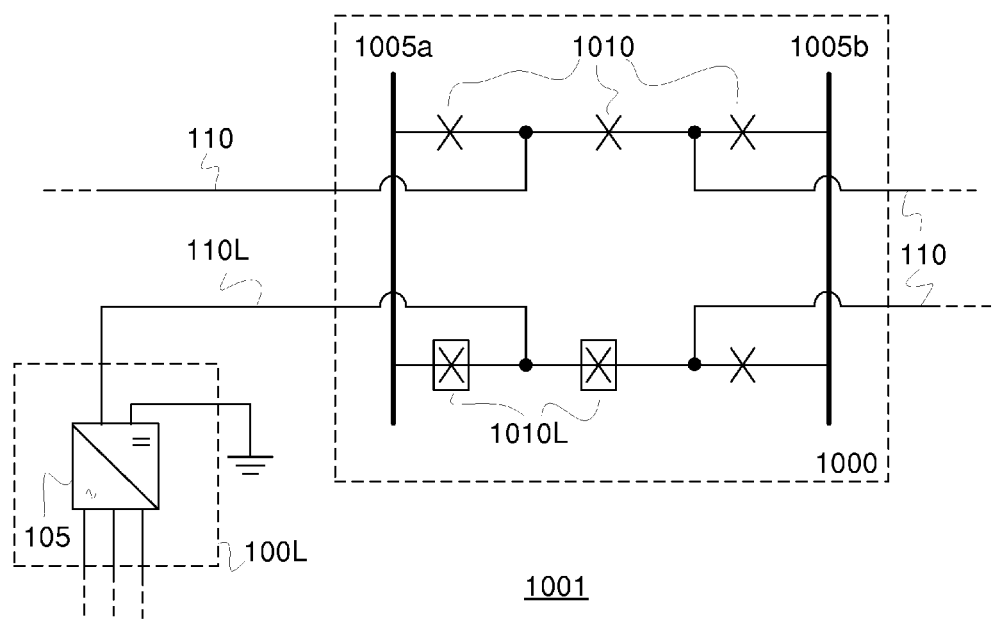

HVDC SWITCHYARD AND AN HVDC SWITCHYARD SYSTEM

TECHNICAL FIELD

The present invention relates to the field of power transmission, and in particular to the field of high voltage DC transmission.

BACKGROUND

Most HVDC transmission systems in use today are point-to-point transmission systems, where electric power is transmitted from one AC system to another. This is an efficient way of transmitting electrical power to/from remote areas, across water, between two unsynchronized AC grids, etc. In many circumstances, however, multi-point HVDC transmission systems, where power can be transmitted to/from at least three different points in one or several AC networks, are desired. A multi-point HVDC transmission system will here be referred to as an HVDC grid, and can also be referred to as a multi-terminal transmission system. One example of when an HVDC grid can be useful is when connecting (multiple) off-shore wind farms to (multiple) on-shore power grids. Another example is when transferring large amounts of power over long distances in existing AC grids, in which case low loss transmission can be achieved by using an HVDC grid as a backbone or over-lay grid to the existing AC grids.

A drawback of DC transmission as compared to AC transmission is that the interruption of a fault current is more difficult. A fault current in an AC system inherently exhibits frequent zero crossings, which facilitate for current interruption. In a DC system, no inherent zero crossings occur. In order to break a DC current, a zero crossing of the DC current generally has to be forced upon the system.

Moreover, a fault current can grow very rapidly to high levels in an HVDC grid. A fast breaking of a fault current is therefore desired.

Thus, in order to limit the effects of a line fault, a DC breaker should react very fast, typically in the transient stage while the fault current still is increasing and before the DC voltages have collapsed too much. Efforts have been put into the development of fast and reliable DC breakers, and the DC breakers that currently provide the fastest interruption of current are based on semi-conducting technology. A semi-conductor DC breaker is for example disclosed in EP0867998. However, semi-conductor DC breakers designed to break large currents are considerably more expensive than mechanical breakers. On the other hand, existing mechanical breakers cannot provide sufficient breaking speed. Thus, there is a need for cost- and energy effective fault current handling in an HVDC grid.

SUMMARY

A problem to which the present invention relates is how to reduce the monetary expenses and materials consumption involved in the construction of a HVDC grid.

One embodiment provides an HVDC switchyard arranged to interconnect a first part of a HVDC grid with at least one further part of the HVDC grid. The HVDC switchyard comprises at least one busbar and at least two switchyard DC breakers. At least one switchyard DC breaker, arranged to connect the first part of the HVDC grid to at least one busbar, is a fast DC breaker, while at least one of the switchyard DC breakers is of lower speed. The at least one lower speed switchyard DC breaker is arranged to interconnect a further part of the HVDC grid with at least one of the at least one busbars. The fast DC breaker is capable of providing a higher breaking speed than the at least one DC breaker of lower speed. The first part of the HVDC grid can for example be a first HVDC station, for example a local HVDC station, while the further part(s) of the HVDC grid could be further HVDC station(s). The first part of the HVDC grid could alternatively include more than one HVDC station 100, and could for example be an HVDC network of a first country or region while the further part(s) of the HVDC grid is an HVDC network of a further country or region. The first HVDC grid part could for example be connected to the HVDC switchyard via a further HVDC switchyard.

A further embodiment provides an HVDC switchyard system arranged to interconnect a first HVDC station with at least one further HVDC station, the HVDC switchyard system comprising the first HVDC station and an HVDC switchyard. The HVDC switchyard comprises at least one busbar and at least one switchyard DC breaker for interconnecting the first HVDC station with the at least one further HVDC station. The first HVDC station is connected to the at least one busbar via at least one fast DC breaker capable of providing a higher breaking speed than at least one switchyard DC breaker, which is of lower speed and which interconnects at least one of the at least one further HVDC stations with at least one of the at least one busbars.

According to the invention, fast and slower DC breakers are combined in an HVDC switchyard arrangement, so that a first HVDC station or first part of a HVDC grid is connected to the busbar(s) of the HVDC switchyard by means of a fast DC breaker, while at least one further HVDC station or further part of the HVDC grid is connected to the busbar(s) of the HVDC switchyard by means of a DC breaker of lower speed. By this combination of fast and slower DC breakers, the HVDC switchyard can be considerably cheaper than an HVDC switchyard wherein all switchyard breakers are fast DC breakers, while adequate protection of against fault currents in the HVDC grid can be provided.

Since the first HVDC station or first part of the HVDC grid is connected to the HVDC grid by means of a fast DC breaker, any fault current components originating from an AC network, to which the first HVDC station or first part of the HVDC grid is connected, can be limited or eliminated at an early point in time after a fault has occurred. The limitation or elimination of such fault current component serves to limit, at an early point in time, the magnitude of the fault current at the HVDC switchyard. The rise of the fault current at the HVDC switchyard will thus be limited, so that DC breakers of lower speed can be used to disconnect the faulty part of the HVDC grid.

An HVDC station which is connected to the HVDC grid by means of an inventive switchyard arrangement, so that the HVDC station is connected to at least one busbar via at least one fast DC breaker, will be adequately protected against thermal breakdown caused by fault currents through the HVDC station, since the fast DC breaker(s) will be able to break or limit the current through the HVDC station, in case of a fault, before thermal damage will have had time to take place.

More than one HVDC switchyard arrangements according to the invention could advantageously be used in a HVDC grid, so that more than one HVDC station or part of the HVDC grid will be connected to the other parts of the HVDC grid via an inventive HVDC switchyard arrangement. Hereby is achieved that yet further resources are saved compared to having HDVC switchyards where all DC breakers are fast breakers.

Compared to not having any switchyards with fast breakers, a fault current at a particular HVDC switchyard will be reduced. At a particular HVDC switchyard, a fault current will be a sum of 1) the current contributions from the AC networks connected to the HVDC grid and 2) capacitor components originating from the discharge of charged capacitances in the HVDC grid. When more than one inventive HVDC switchyard arrangement are used in the HVDC grid, the current contributions from the AC networks connected to a particular HVDC switchyard via other inventive HVDC switchyard arrangements will be limited or eliminated at an early point in time. The fault current to be broken by switchyard DC breakers of lower speed will thus be even lower, so that the current-breaking capability requirements on the lower speed DC breakers will be lower.

A first HVDC station is typically a local HVDC station, but an HVDC switchyard arrangement according to the invention can also be connected so that a first HVDC station, connected to a busbar via a fast DC breaker, is a distant HVDC station. This can for example be beneficial when a local HVDC station is connected to an AC network of lower power than the AC network which is connected to a first, distant, HVDC station, where the effects of the stronger AC network on the fault current in the HVDC switchyard will be more significant than the effects of the weaker AC network connected to the local HVDC station.

In one implementation of the embodiment wherein the fast DC breaker(s) forms part of the HVDC switchyard, any switchyard DC breaker arranged to connect the first HVDC station or first part of the HVDC grid to any busbar is a fast DC breaker. In another implementation of the embodiment wherein the fast DC breaker(s) forms part of the HVDC station, the at least one switchyard DC breaker interconnecting the first HVDC converter station with at least one busbar is of lower breaking speed than the at least one fast DC breaker. By using slower DC breaker is achieved that expenses are saved in relation to these at least one switchyard DC breaker(s).

In one implementation of the invention, any switchyard DC breaker arranged to connect a further HVDC station to any busbar is a DC breaker of lower speed. Hereby is achieved that the savings made by use of the invention will be high.

The fast DC breaker(s) can advantageously be power electronic DC breaker(s), while the switchyard DC breaker(s) of lower speed can advantageously be mechanical DC breaker(s). Mechanical breakers are typically considerably cheaper than power electronic breakers, which on the other hand provide a fast breaking operation.

In one implementation, the breaking time of the at least one fast DC breaker is 10 ms or less. Hereby is achieved that a fault current of unacceptable magnitudes, which are either damaging to the equipment or difficult to break, can generally be avoided even in the case of a fault.

In one implementation, a fast DC breaker comprises: a main semiconductor switch of turn-off type; a surge diverter connected in parallel with the main semi-conductor switch; and a series connection of a high speed switch and an auxiliary semiconductor switch of turn-off type, wherein the series connection is connected in parallel to the main semiconductor switch and the surge diverter. This design of a fast DC breaker is power efficient, since the current can flow through series connection of the high speed switch and the auxiliary semiconductor switch during normal operation. The auxiliary semiconductor switch can be very much smaller than the main switch, and thereby very much more power efficient, since it will not have break the current, but only commutate the current to the main switch.

The fast DC breaker could comprise a series connection of at least two independently switchable breaker sections, so that the fast DC breaker could operate as a current limiter. In some fault scenarios, real or suspected, it might be sufficient to limit the current, and a breaking operation, which can cause severe disturbances in the HVDC grid and connected AC networks, can thereby be avoided.

The invention is suitable for the connection of an HVDC station to an HVDC switchyard of any configuration, for example a one-and-a-half-breaker switchyard; a two-breaker/two-busbar switchyard; a two-main-busbar/single-breaker switchyard; a one-main-and-one-auxiliary-busbar/single-breaker switchyard; a two-main-and-one-auxiliary-busbar/single-breaker switchyard; a double-bus-bar-selection switchyard; or a ring bus switchyard.

The invention further relates to a HVDC grid comprising the switchyard arrangement discussed above.

BRIEF DESCRIPTION OF THE DRAWINGS

FIG. 3a is a schematic illustration of an embodiment of an HVDC switchyard system according to the invention.

FIG. 3b schematically illustrates another embodiment of an HVDC switchyard system according to the invention.

DETAILED DESCRIPTION

Figure 1:
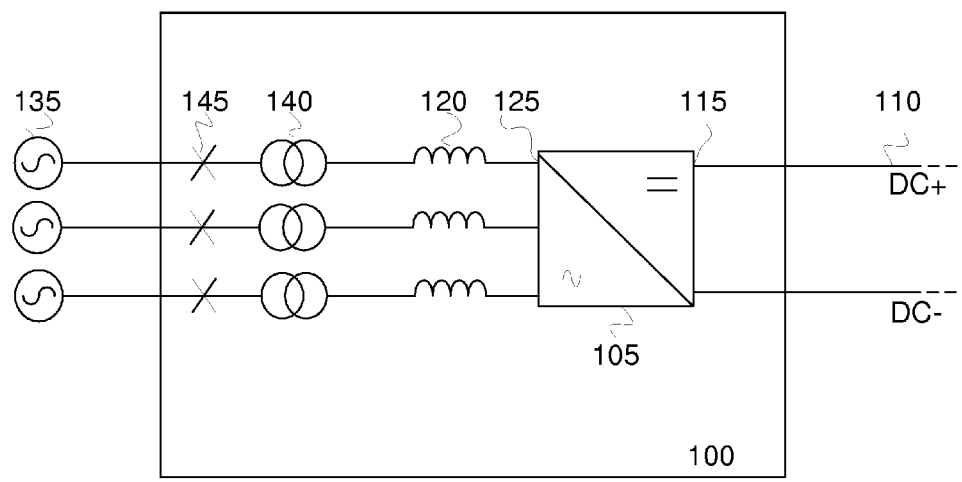
FIG. 1 is a schematic illustration of an example of an HVDC station.

FIG. 1 is a schematic illustration of an HVDC converter station 100, or HVDC station 100 for short. The HVDC station 100 of FIG. 1 comprises an HVDC converter 105 to which DC transmission lines 110 have been connected via DC interface 115. HVDC converter 105 could be a VSC (Voltage Source Converter) converter or a CSC (Current Source Converter) converter. HVDC station 100 of FIG. 1, which is illustrated to be a three phase converter station, further comprises three AC phase reactors 120, or AC reactors 120 for short, each connected to an AC phase interface 125 of the VSC converter 105. HVDC station 100 of FIG. 1 is connected to an AC system 135 on the AC side via transformers 140. AC system 135 can be an AC grid to which power is provided via the DC transmission lines 110, or an AC power source providing power to be transmitted via DC transmission lines 110. Typical nominal voltage and current ratings of an HVDC station 100 of today are for example 80 kV, 500 A or 320 kV, 2 kA.

An HVDC station 100 is, when in use, connected to at least one further HVDC station 100, to or from which electric power may be transmitted or received, so that at least two HVDC stations 100 form an HVDC power transmission system.

In a high voltage power transmission system, it is of high importance that the transmission paths can be broken in case of a short circuit or earth fault situation. The HVDC station 100 of FIG. 1 is equipped with an AC breaker 145 connected between the AC system 135 and the AC phase interface 125. Typically, an AC breaker 145 is provided for each AC phase, as shown in FIG. 1. Upon detection of a major fault, the AC breaker 145 will be tripped. The time required for breaking the current by means of a typical mechanical AC breaker 145 is around 40-60 ms, corresponding to 2-3 fundamental frequency periods of a 50 Hz or 60 Hz AC system 135.

An HVDC station 100 typically includes further equipment, which has been left out for illustration purposes. The HVDC station 100 could be a symmetric monopolar converter station, an asymmetric monopolar converter station or a bipolar converter station. In some implementations of HVDC stations 100, the transformers 140 are omitted, while in others, the transformer impedance is such that the AC reactors 120 may be left out. The HVDC station 100 could have any number of AC phases, including one.

DC breakers have been developed and proposed inter alia for interconnecting more than two HVDC stations 100 into a network of HVDC stations forming an HVDC grid, so that a faulty HVDC station 100, or other faulty equipment, can be disconnected from the HVDC grid without causing any harm to the remaining HVDC stations 100 of the grid. In order to achieve this, HVDC switchyards have been proposed, wherein DC transmission lines 110 from different HVDC stations 100 are interconnected via switchyard DC breakers. Unless a faulty HVDC station 100 or other faulty equipment can be disconnected from the other HVDC stations 100, short circuit currents will be transmitted through the healthy HVDC stations 100, which will then also be at risk. Short circuit currents will typically grow very rapidly into current surges. Hence, it is important that the disconnection of a faulty HVDC station, DC transmission line or other equipment in the HVDC grid can be performed at high speed. By the term current surge is here meant the quickly rising part of a fault current occurring upon a fault in the HVDC grid.

Figure 2:
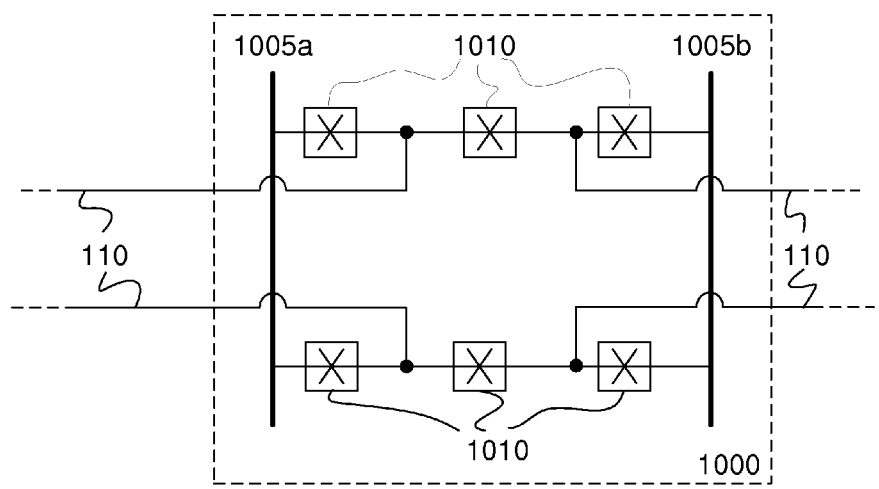
FIG. 2 is a schematic illustration of an HVDC switchyard.

An example of an HVDC switchyard 1000 is shown in FIG. 2. The HVDC switchyard 1000 of FIG. 2 interconnects, via two busbars 1005, four DC transmission lines 110 from four different HVDC stations 100. If an earth fault, or short circuit fault, occurs in one of the HVDC stations 100, or in one of the transmission lines 110 connected to the HVDC switchyard 1000, the switchyard DC breakers 1010 connecting such faulty HVDC station/DC transmission line to the HVDC switchyard 1000 will be tripped so that the faulty HVDC station/DC transmission line will be disconnected or the fault current limited, so that the remaining HVDC stations 100 could continue in operation. A switchyard is typically designed so that a busbar of the switchyard is separated from each object connected to the switchyard via at least one DC breaker.

The HVDC switchyard 1000 of FIG. 2 is a so called one-and-a-half-breaker switchyard, where six switchyard DC breakers 1010 are provided to separate the four DC transmission lines 110 from each other. Hence, each transmission line 110 is protected by more than one DC breaker 1010, so that adequate protection can be provided also if a DC breaker 1010 fails, or if a DC breaker 1010 is taken out of operation for maintenance. In the one-and-a-half-breaker configuration of FIG. 2, two busbars 1005 are interconnected by a line to which two DC transmission lines 110 have been connected, where a DC breaker 1010 is provided between a busbar and the connection point of a DC transmission line 110, as well as between the two connection points of the DC transmission lines 110. Other configurations of HVDC switchyards 1000 could alternatively be used, such as the so called a two-breaker/two-busbar switchyard; the two-main-busbar/single-breaker switchyard; the one-main-and-one-auxiliary-busbar/single-breaker switchyard; the two-main-and-one-auxiliary/single-breaker switchyard; the ring bus switchyard (also known as a closed-mesh switchyard); or the double bus bar selection switchyard, all known in the art, or any other HVDC switchyard configuration. Furthermore, an HVDC switchyard 1000 could interconnect any number of HVDC stations 100. The term HVDC transmission line 110 is here used to refer both to lines for power transmission over long distances, and to connection lines for connecting an HVDC station 100 to a nearby HVDC switchyard 1000.

The HVDC switchyard 1000 of FIG. 2 serves to interconnect a first pole of an HVDC station 100 with a first pole of three further HVDC stations 100. A second HVDC switchyard 1000 interconnecting the second pole of the HVDC station 100 with the second pole of the further HVDC stations 100 will typically be provided in relation to bipolar HVDC stations 100, as well as in some mono-polar configurations. A third switchyard could possibly be provided for the ground or a metallic return arrangement. However, for illustration purposes, only a first switchyard will be considered in the following description, and any further HVDC switchyard could be arranged in a similar way.

As mentioned above, it is important that the disconnection of the faulty piece of equipment (HVDC station 100, DC transmission line 110, busbar 1005 etc) can be performed at high speed, since fault currents in the HVDC grid will rise to high levels very quickly, and current surges brought about by such fault will travel fast through the HVDC grid. If the DC breakers 1010 of the HVDC switchyard 1000 are too slow, discharge in the HVDC switchyard 1000 will significantly lower the DC voltage at the HVDC stations 100 feeding current into the fault, and this may result in the disconnection of these in-feeding HVDC stations 100, and possibly a collapse of the entire HVDC grid. Furthermore, if the switchyard breakers 1010 are slow, there is a risk that the current rises beyond a level above which the switchyard breakers 1010 will not be able to perform the required breaking operation.

However, fast DC breakers which are designed to break large currents are generally expensive.

According to the invention, adequate protection of the HVDC grid will be provided by a switchyard arrangement wherein only some of the DC breakers are high speed breakers, whereas the remaining DC breakers are simpler breakers of lower breaking speed. The monetary expenses involved in providing such switchyard system will be considerably reduced as compared to a switchyard system wherein all DC breakers are high speed breakers.

A short circuit current, also referred to as a fault current, which rises upon occurrence of a fault, typically includes two types of current components: Power source components originating from the AC networks 135 to which the HVDC stations 100 are connected; as well as capacitor components originating from the discharge of charged capacitors in HVDC grids, such as capacitors in the HVDC stations, capacitive charging of the transmission lines 110 and other capacitors in the HVDC grid. The power source components typically rise quickly to a high magnitude, which magnitude will remain more or less constant if no measures are taken.

The capacitor components, on the other hand, are a transient contribution which will quickly rise to a high level, and then subside as the capacitors will be discharged.

As mentioned above, it is desirable to break or limit the fault current through a DC switchyard 1000 before the fault current rises beyond the level above which the switchyard breakers 1010 will not be able to break the current. If a fault occurs in the vicinity of a power source, i.e. in the vicinity of an HVDC station 100, the impedance between the power source and the fault will be low, so that the power source component of the fault current will rapidly grow to a high level (the level also depends on the strength of the AC network to which the HVDC station is connected). However, if the fault occurs far away from the power source, the impedance in the transmission lines 110 will somewhat limit and delay the power source component of the fault current. Hence, in relation to a DC transmission line 110 which interconnects the HVDC switchyard 1000 with a nearby HVDC station 100, fast DC breakers are typically desired, whereas in relation to a DC transmission line 110 which interconnects the HVDC switchyard 1000 with HVDC stations 100 located far away from the HVDC switchyard 1000, DC breakers of lower speed will typically be sufficient.

An HVDC switchyard 1000 if often located in the vicinity of one of the HVDC stations 100 that it interconnects, such HVDC station 100 here being referred to as a local HVDC station 100—the distant HVDC stations, typically located at a distance of 100 km or more from the HVDC switchyard 1000, are referred to as distant HVDC stations 100. A local HVDC station 100 is an HVDC station 100 which is connected to the HVDC grid via the HVDC switchyard 1000. The local HVDC station 100 is typically, out of the HVDC stations 100 which are interconnected by means of an HVDC switchyard 1000, the HVDC station 100 that is connected to the HVDC switchyard 1000 via the shortest transmission line 110.

By use of an HVDC switchyard system wherein a local HVDC station 100 is connected to the HVDC switchyard 1000 by means of fast DC breakers, the power source fault current component originating from the local HVDC station 100 can quickly be limited or broken, so that the remaining components of the fault current will be the power source components from the more distant HVDC stations 100, as well as the capacitor components. Due to the higher impedance, the power source components originating from the more distant HVDC stations 100 will typically not (at least initially) be of such strong power, so that although a breaking operation would take longer time with a low speed breaker, a low speed DC breaker would still be able to break the current. Even if the capacitor components are of such magnitude so that the fault current would reach beyond a level above which the switchyard breakers 1010 would not be able to perform the breaking operation, the capacitor component of the fault current would subside, and the current level would reach the level of (the sum of) the power source components originating from the more distant HVDC station. Hence, a slower breaking operation of the switchyard breakers 1010 interconnecting the HVDC switchyard with the more distant HVDC stations 100 could actually be advantageous in the inventive HVDC switchyard system, since in some implementations, a lower current breaking capacity would be required of these DC breakers 1010 if the breaking operation occurs at such time when the capacitor component of the fault current has had time to subside before the breaking operation is performed.

In one embodiment of the invention, the HVDC switchyard 1000 and the local HVDC station 100 form an HVDC system 1001 such that the switchyard breakers 1010 are all DC breakers of a lower speed, while the local HVDC station 100 is connected to the HVDC switchyard 1000 via a fast DC breaker. An example of a HVDC switchyard system according to this embodiment is shown in FIG. 3*a*. A local HVDC station 100, here denoted 100L, is connected to the HVDC switchyard 1000 via an HVDC transmission line 110, here referred to as local HVDC transmission line 110L, in which a DC breaker 500 is connected in series. The DC breaker 500 forms part of the local HVDC station 100L, and will be referred to as an HVDC station DC breaker 500. A local transmission line 110L could, in some implementations, be very short (e.g. in the order of 10 meters). If the distance between the local HVDC station 100L and the HVDC switchyard 1000 is short, the local transmission line 110L will be more of an HVDC connection than a line for transmitting power over a long distance.

The local HVDC transmission line 110L of FIG. 3*a* is connected to the HVDC switchyard 1000 by means of two switchyard DC breakers 1010, which in this embodiment can advantageously be of lower operating speed than the HVDC station DC breaker 500—if a local HVDC station 100L is provided with a fast HVDC station DC breaker 500, i.e. a DC breaker of breaking time of 10 ms or shorter, it is often sufficient to use, as the switchyard DC breakers 1010, DC breakers of lower operating speed. DC breakers of lower operating speed, for example mechanical DC breakers, are typically far less costly than fast DC breakers, and a big reduction in materials consumption and monetary expense can be achieved by using DC breakers of different speed in the local HVDC station 100 and in the HVDC switchyard 1000.

In the accompanying drawings, fast DC breakers are indicated by a rectangle surrounding the breaking symbol, while the symbols indicating slower DC breakers have no such surrounding rectangle. In the configuration shown in FIG. 3*a*, all switchyard DC breakers 1010, including switchyard DC breakers 1010L, are DC breakers of a slower type, while the HVDC station DC breaker 500 is a fast DC breaker.

A local HVDC station 100L is typically more vulnerable than the distant HVDC stations 100 to the current surge occasioned by an earth fault or short circuit in the grid, since the lengthy DC transmission lines 110 interconnecting the distant HVDC stations 100 with the HVDC switchyard 1000 will provide an impedance and longer transmission times. By using slower DC breakers 1010 in the HVDC switchyard 1000, any fault current will have time to grow larger in the vicinity of the HVDC switchyard 1000 than if fast DC breakers were used in the switchyard 1000, and hence, the HVDC transmission lines 110 and the busbars 1005 will be exposed to higher current transients. However, the HVDC transmission lines 110 and busbars 1005 are typically far less sensitive to current magnitude than the devices of an HVDC station 100, and the HVDC transmission lines 110 and busbars 1005 will generally not be damaged by the occurring current surges. Furthermore, in case of a fault, a local HVDC station 100L will more quickly feed in a power source component of the fault current into the HVDC switchyard than the more distant HVDC stations 100, and the disconnection or current limitation of the local HVDC station 100L is typically more urgent than the disconnection or current limitation of the more distant HVDC stations 100.

Hence, in order to save on monetary expenses and semi-conducting material, the switchyard DC breakers 1010 could advantageously be breakers of lower speed, such as mechanical DC breakers, if any local HVDC station(s) 100L, connected to HVDC grid via the HVDC switchyard 1000 and located in the vicinity of HVDC switchyard 1000, is equipped with a fast DC breaker 500.

The concept of using DC breakers of different breaking speed when connecting a local HVDC station 100L to an HVDC switchyard 1000 could be applied to HVDC grids comprising HVDC stations 100 of any design. In fact, the use of DC breakers of different speed when connecting a local HVDC station 100L to an HVDC switchyard 1000 is not limited to HVDC stations 100L comprising a fast DC breaker 500. When interconnecting a local HVDC station 100L which does not include a fast DC breaker 500, the HVDC switchyard 1000 itself could include DC breakers of different speed, so that the local HVDC station 100L is connected to the HVDC switchyard 1000 via high speed switchyard DC breakers 1010 (denoted switchyard DC breakers 1010L), while the remote HVDC stations 100 could be connected to the HVDC switchyard 1000 via slower switchyard DC breakers 1010. The high speed switchyard DC breakers 1010L could e.g. be electronic breakers, the switchyard DC breakers 1010 of lower speed could for example be mechanical DC breakers. An example of such configuration is shown in FIG. 3b, where a local HVDC station 100L is connected to an HVDC switchyard 1000 via two fast switchyard DC breakers 1010L, forming part of the HVDC switchyard 1000, while the HVDC switchyard 1000 furthermore comprises slower switchyard DC breakers 1010 for connection of more distant HVDC stations 100.

Upon detection of a major fault in an HVDC station 100 or DC transmission line 110 connected to the HVDC switchyard 1000 of FIG. 3a, the fast DC breaker 500 of a local HVDC station 100 will be tripped, as well as the ones of the switchyard DC breakers 1010 which connect the faulty HVDC station/DC transmission line to the switchyard 1000. The opening of the fast DC breaker 500 will be completed well before the critical time at which the current surge would otherwise have caused damage to the local HVDC station 100. Once successful opening of the relevant switchyard DC breakers 1010L has taken place, the DC breaker 500 of the local HVDC station 100L can be closed, so that this local HVDC station 100L can continue the interrupted energy transfer via the HVDC grid. In the time period during which the local HVDC station 100 was disconnected from the HVDC grid, SVC operation of the local HVDC station 100 could continue, thereby minimizing the disturbances in the AC system 135 caused by the fault in the HVDC grid.

Upon detection of a major fault in a local HVDC station 100 connected to the HVDC switchyard 1000 of FIG. 3b, the fast switchyard DC breakers 1010L of the switchyard 1000 will be tripped. Upon detection of a major fault in a transmission line 110 connecting further HVDC stations 100 to the HVDC switchyard 1000, or in a further HVDC station 100, the fast switchyard DC breakers 1010L will be opened, as well as the switchyard DC breakers connecting the further HVDC station 100/transmission line 110 where the fault has occurred. Also in this situation, SVC operation of the local HVDC station 100 could continue.

Figure 4A:
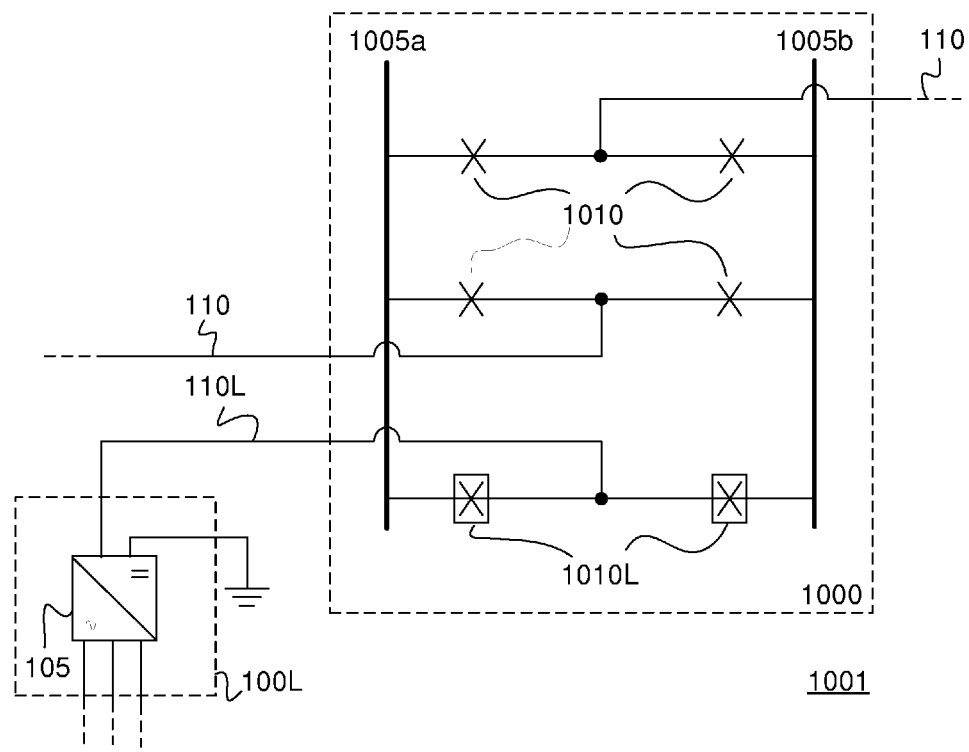
FIG. 4a schematically illustrates an alternative implementation of the embodiment shown in FIG. 3b.
Figure 4B:
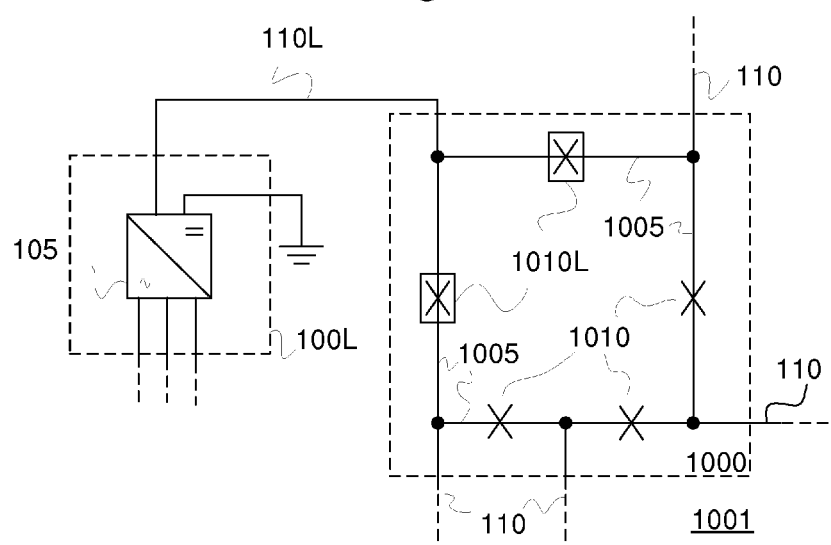
FIG. 4b schematically illustrates another alternative implementation of the embodiment shown in FIG. 3b.

The inventive concept of connecting a local HVDC station 100L to a HVDC switchyard 1000 via at least one fast DC breaker can be applied in an HVDC switchyard system 1001 of any configuration, such as the so called a two-breaker/two-busbar switchyard; a two-main-busbar/single-breaker switchyard; a one-main-and-one-auxiliary-busbar/single-breaker switchyard; a two-main-and-one-auxiliary-busbar/single-breaker switchyard; a double-bus-bar-selection switchyard; or a ring bus switchyard. Two further examples of HVDC switchyard configurations where the inventive concept has been applied are shown in FIGS. 4a and 4b. These examples are shown for illustration purposes, and the invention could be applied to any HVDC switchyard configuration. In the examples shown in FIGS. 4a and 4b, the fast DC breaker(s) by which the local HVDC station 100L is connected to the HVDC switchyard 1000 are the switchyard DC breakers 1010L forming part of the HVDC switchyard 1000 (cf. FIG. 3b). However, the embodiment of FIG. 3a, wherein the fast DC breaker by which the local HVDC station 100L is connected to the HVDC switchyard 1000 is a DC breaker 500 forming part of the HVDC station 100L, could also be used in relation to any switchyard configuration.

In a two busbar/two breaker switchyard configuration, of which an example is shown in FIG. 4a, an HVDC station 100 is connected between two busbars 1005a and 1005b via two switchyard DC breakers 1010 in a manner so that there is a switchyard DC breaker 1010 between the HVDC station 100 and each of the busbars 1005a, 1005b, and so that each of these switchyard DC breakers 1010 is arranged to protect one HVDC station 100 only. In FIG. 4a, the switchyard breakers 1010L connecting a local HVDC station 100L to the HVDC switchyard 1000 are fast DC breakers, whereas the switchyard breakers 1010 connecting the distant HVDC stations 100 are DC breakers of lower speed.

FIG. 4b shows an HVDC switchyard system 1001 wherein the HVDC switchyard 1000 is of a ring bus switchyard configuration, wherein busbars 1005 are connected in a ring, to which DC transmission lines 110 can be connected, and wherein switchyard DC breakers 1010 are connected so that adjacent transmission line connections are separated by at least one switchyard DC breaker 1010.

The HVDC stations 100L shown in FIGS. 3a-b and FIGS. 4a-b are shown to be asymmetric mono-polar HVDC stations which are provided with a connection to ground. The inventive concept of connecting a local HVDC station 100L to an HVDC switchyard by means of fast DC breakers, while at least some of the switchyard DC breakers 1010 connecting distant HVDC stations 100 are DC breakers of lower speed, can be used also in relation to bipolar and symmetric mono-polar HVDC stations 100.

In the HVDC switchyard arrangements of FIGS. 3a and 3b, a local HVDC station 100L is connected to the busbar(s) 1005 of an HVDC switchyard 1000 via at least one fast DC breaker 500/1010L, whereas at least one distant HVDC station 100 is connected to the HVDC switchyard 1000 via a switchyard DC breaker 1010 of lower speed. However, some of the distant HVDC stations 100 could be connected to the HVDC switchyard 1000 by means of at least one further fast DC breaker 500/1010L, if desired. An HVDC switchyard 1000 could be arranged such that more than one DC transmission line 110 can be connected to the HVDC switchyard 1000 via fast switchyard DC breakers 1010L.

In the above, the inventive HVDC switchyard arrangement has been described in relation to a local HVDC station 100L which is connected to at least one busbar 1005 of the HVDC switchyard 1000 via at least one fast DC breaker 500/1010L. In another application, a fast switchyard breaker 1010L is used for connecting a distant HVDC station 100 to at least one busbar 1005 of an HVDC switchyard 1000, while a local HVDC station 100L is connected via DC breaker(s) of lower speed. This can for example be beneficial when a local HVDC station is connected to an AC network 135 of lower power than the AC network 135 which is connected to a distant HVDC station, where the effects of the stronger AC network 135 on the fault current in the HVDC switchyard 1000 will be more significant than the effects of the weaker AC network connected to the local HVDC station 100L.

In another application of the invention, a first part of an HVDC grid is connected to at least one busbar 1005 of an HVDC switchyard 1000 via at least one fast switchyard DC breaker 1010L, while at least one further part of the HVDC grid is connected to the busbar(s) 1005 via slower switchyard DC breakers 1010. Hence, an HVDC switchyard 1000 having a combination of fast and slower switchyard DC breakers could be used for the connection, via a fast DC breaker 1010L, of a larger part of the HVDC grid than a single HVDC station 100 to a further part of the DC grid. The first part could in this application for example be an HVDC network of a first country or region, while the further part(s) of the HVDC grid could be an HVDC network of a further country or region. Such a configuration of an HVDC switchyard, which has a combination of fast and slower switchyard DC breakers, could be used to limit the effects of a fault to one zone, where a zone could for example be a country or a region.

More than one HVDC switchyard arrangements according to the invention could advantageously be used in a HVDC grid, so that more than one HVDC station or part of the HVDC grid will be connected to the other parts of the HVDC grid via an inventive HVDC switchyard arrangement. At a particular HVDC switchyard, a fault current will be a sum of 1) the current contributions from the AC networks connected to the HVDC grid and 2) capacitor components originating from the discharge of charged capacitors in HVDC grid. When more than one inventive HVDC switchyard arrangement are used in the HVDC grid, the current contributions from the AC networks connected to a particular HVDC switchyard via other inventive HVDC switchyard arrangements will be limited or eliminated at an early point in time. The fault current to be broken by switchyard DC breakers of lower speed will thus be even lower, so that the current-breaking capability requirements on the lower speed DC breakers will be lower. In order to minimise the fault current occurring at an HVDC switchyard, each HVDC station 100 could be connected to the DC grid in a manner so that a fast DC breaker 500/1010L is connected between the HVDC converter 105 and the busbars 1005 of an HVDC switchyard 1000 via which the HVDC station 100 is connected to the HVDC grid.

Figure 4C:
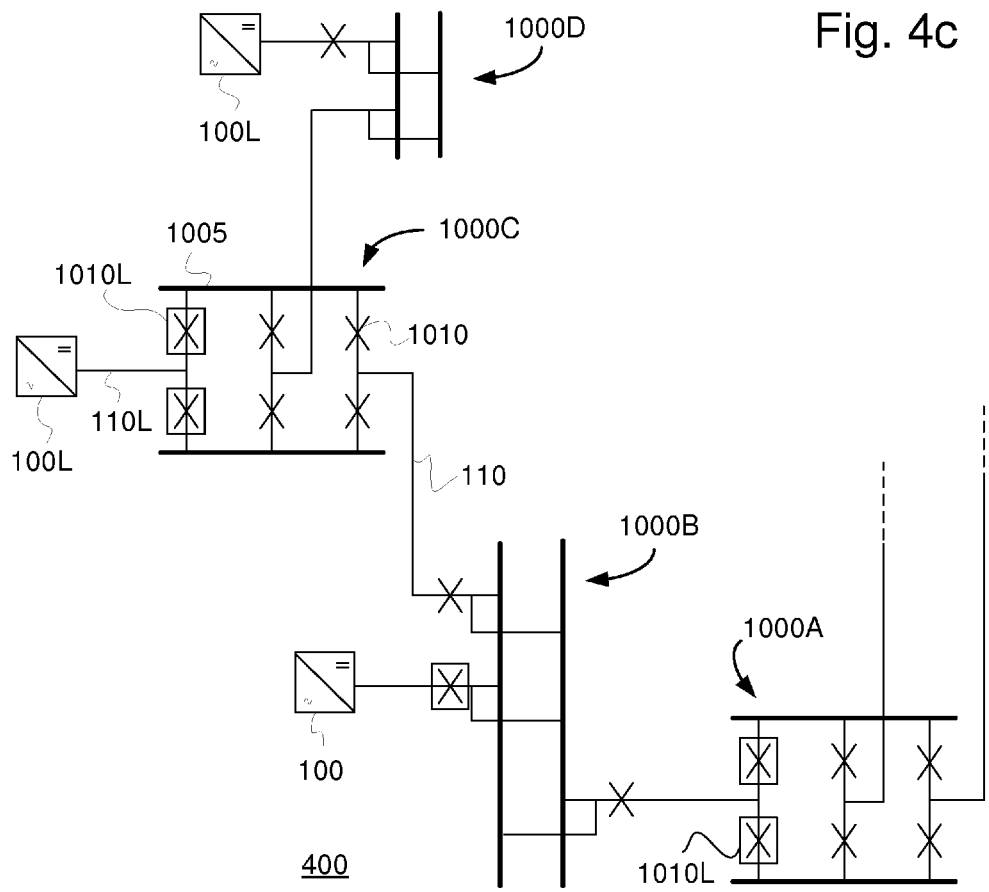
FIG. 4c schematically illustrates an HVDC grid comprising HVDC switchyard arrangements according to the invention.

An HVDC grid 400 comprising several HVDC switchyard arrangements according to the invention is shown in FIG. 4c. The HVDC grid 400 of FIG. 4c is an example only, and any combination of HVDC switchyards, either comprising a combination of fast and slower switchyard DC breakers, or having switchyard DC breakers of the same breaking speed only, could be implemented. Four different HVDC switchyards 1000A, 1000B, 1000C and 1000D of HVDC grid 400 have been shown in FIG. 4c. Switchyard 1000A interconnects an HVDC network comprising switchyards 1000B, 1000C and 1000D with two other networks (not shown) via a combination of fast switchyard DC breakers 1010L and slower DC breakers 1010. Switchyard 1000B, switchyard 1000C and switchyard 1000D each connect a HVDC station 100 to the HVDC grid 400, where switchyards 1000B and 1000C are switchyards according to the invention which each comprises a combination of fast and slower switchyard breakers. Switchyard 1000D is a switchyard having only a slower DC breaker 1010. Since the power source component of the fault current originating from the HVDC stations connected to switchyards 1000A-C will be quickly limited or eliminated by the fast switchyard DC breakers 1010L of these switchyards, the slower DC breaker 1010 will be sufficient for protecting the HVDC station connected to HVDC switchyard 1000D, and the HVDC grid 400, from damage caused by fault currents. This is particularly true if the AC network 135, which is connected to the HVDC station 100 connected to switchyard 1000D, is a comparatively weak network. Hence, the inventive HVDC switchyard arrangement can facilitate also for the use of HVDC switchyards where HVDC stations are connected to the busbars of an HVDC switchyard via slower switchyard DC breakers only.

A fast DC breaker is sufficiently fast if it is capable of breaking a current within a particular breaking time $t_{DC}$ from the onset of the opening of the DC breaker, where the breaking time $t_{DC}$ of the DC breaker is shorter than the time required for the worst case fault current to generate a destructive amount of heat in the HVDC grid equipment that the DC breaker 200 is protecting. Typically, $t_{DC}$ of a fast DC breaker 500 is in the order of a tenth of breaking time $t_{AC}$ of a typical AC breaker. As will be discussed below, DC breakers 500 having breaking times $t_{DC}$ as short as 2 ms are presently available, corresponding to one tenth of a fundamental frequency period of the AC system 135. By the term fast DC breaker 500 is here meant a DC breaker of breaking time $t_{DC}$ of around 10 ms or shorter, i.e. a breaking time corresponding to half of a fundamental frequency period in a 50 or 60 Hz AC system 135, or shorter.

Figure 5A:
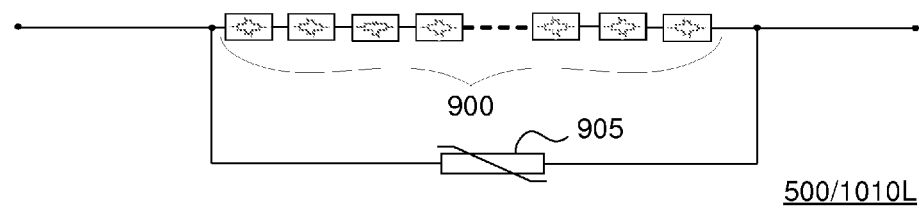
FIG. 5a is a schematic illustration of an embodiment of a fast DC breaker.

Fast DC breakers 500/1010L as discussed above could be of any design which can provide a breaking time approximately 10 ms, or less, for example 5 ms, 2 ms, or shorter. The ratio of the breaking speed of the fast DC breaker 500/1010L to the breaking speed of the switchyard DC breaker 1010 of lower speed is, in one embodiment, two or more. A fast DC breaker 500/1010L could for example be an electronic DC breaker, such as an electronic DC breaker as described in EP0867998, wherein a semi-conductor switch of turn-off type is connected in parallel with a surge diverter to form an electronic DC breaker. An example of such a fast DC breaker 500/1010L is shown in FIG. 5a. The fast DC breaker 500/1010L of FIG. 5a comprises a parallel connection of an electronic switch 900 of turn-off type and a surge diverter 905 (also known as an arrester or a non-linear resistor).

Figure 5B:
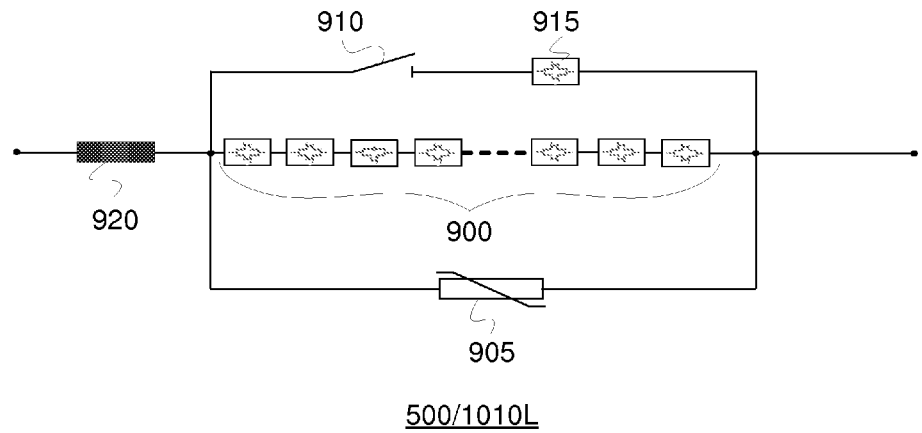
FIG. 5b is a schematic illustration of an alternative embodiment of a fast DC breaker.
Figure 5C:
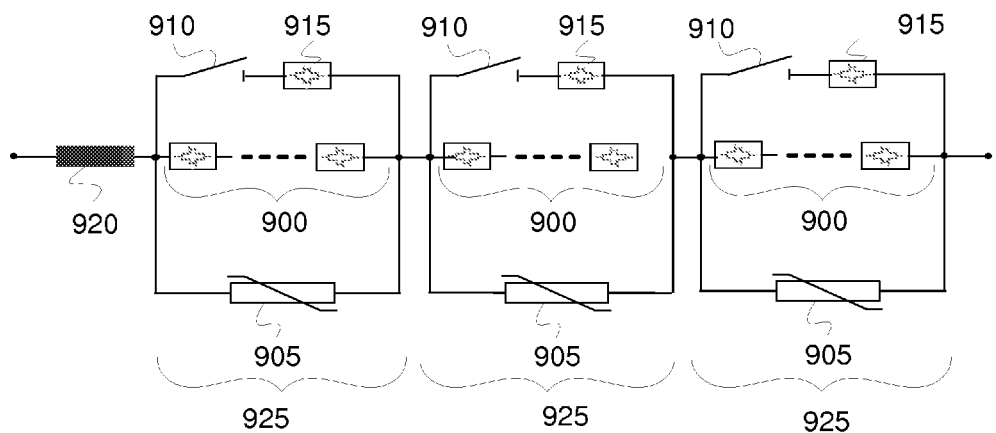
FIG. 5c is a schematic illustration of an embodiment of a fast DC breaker which can also operate as a current limiter.

Suitable fast electronic DC breakers 500/1010L are also disclosed in patent application PCT/EP2009/065233, of which examples are shown in FIGS. 5b and 5c. The DC breaker 500/1010L of FIG. 5b is an electronic DC breaker comprising a parallel connection of a (main) electronic switch 900 of turn-off type and a surge diverter 905. The fast DC breaker 500/1010L of FIG. 5b further comprises a series connection of a high speed disconnector 910 and an auxiliary electronic switch 915 of turn-off type, where this series connection is connected in parallel to the main electronic switch 900 and the surge diverter 905. The fast DC breaker 500/1010L of FIG. 5b further comprises an (optional) reactor 920 connected in series with the parallel connection, the reactor 920 providing current limitation. The on-resistance of the auxiliary switch 915 of FIG. 5b is considerably smaller than that of the main switch 900. Moreover, the current breaking power of the auxiliary electronic switch 915 can be considerably lower than that of the main switch 900. During normal operation, the current will flow through the series connection of the auxiliary switch 915 and the high speed disconnector 910. Upon detection of a possible need for breaking the current, the auxiliary switch 915 will be opened and the current will be commutated to the main switch 900. When current no longer flows through the high speed disconnector 910, the high speed disconnector 910 will be opened, ensuring a high voltage withstanding capability of the series connection of the high speed disconnector 910 and the auxiliary switch 915. In order to break the current, the main switch 900 will then be opened. By the DC breaker shown in FIG. 5b, efficient, high-speed breaking of the current can be obtained by means of the main switch 900, while the drawback of enhanced power dissipation in the main switch 900 can mostly be avoided, since during normal operation, basically no current will flow through the main switch 900. The opening of the auxiliary switch 915 could advantageously be triggered upon an indication that the current may have to be broken, while the triggering of the main switch 900 could be made conditional on a confirmation from a protection system that the breaking of the current is actually required.

In FIG. 5*b*, the auxiliary switch 915 is shown to include one switch base element comprising two semiconducting power electronic switching elements of turn-off type connected in anti-parallel, while the main switches 900 of FIGS. 5*a* and 5*b* are shown to comprise a series connection of a plurality of such switch base elements. Other types of switch base elements could further alternatively be used, such as for example switch base elements wherein a switching element of turn-off type is connected in parallel with an anti-parallel diode (forming a unidirectional switch base element); or two such unidirectional switch base elements of opposite direction connected in series; or simply a switching element on its own. The auxiliary switch 915 could include further switch base elements, and/or the switch base elements of the auxiliary switch 915 and the main switch 900 could be of different types.

Suitable switching elements of turn-off type for use in an electronic DC breaker 500/1010L are for example IGBTs, GTOs and IGCTs. Surge diverters 905 for use in an electronic DC breaker 500/1010 could for example be made from a material having non-linear resistivity, such as ZnO or SiC resistors, in a known manner.

The fast DC breakers 500/1010L of FIGS. 5*a* and 5*b* are given as examples only, and a fast DC breaker 500/1010L could be implemented in alternative ways. In one embodiment, a fast DC breaker 500/1010L could comprise a series connection of two or more independently switchable breaker sections, so that the fast DC breaker 500/1010L could operate as a current limiting arrangement as well as a DC breaker. An example of such fast DC breaker 500/1010L which may operate as a current limiter, as well as a DC breaker, is shown in FIG. 5*c* (see also FIG. 4 of EP0867998). The current limiting DC breaker of FIG. 5*c* comprises a series connection of three different breaker sections 925, where each breaker section 925 comprises a main switch 900, a surge diverter 905 and a series connection of high speed disconnector 910 and an auxiliary switch 915, where the main switch 900, the surge diverter 905 and the series connection of 910 & 915 are connected in parallel. The breaker sections 925 are independently switchable, so that a subset of the breaker sections 925 could be opened, while (a limited) current would still be flowing through the fast DC breaker 500/1010L. Such opening of a sub-set of the breaker sections 925 will be referred to as partial opening of the fast DC breaker 500/1010L, and could include the switching of one or more of the breaker sections 925 between the open and closed states. The fast DC breaker 500/1010L shown in FIG. 5*c* could be triggered to open either fully, or partially (typically with a conditional full opening at a later point in time). By opening the fast DC breaker 500/1010L partially, the current through the fast DC breaker 500/1010L could be limited to a certain value. The fast DC breaker 500/1010L could then be kept in the current limiting mode until a protection system has been able to derive information on what may have caused the fault situation, and whether or not the fast DC breaker 500/1010L should be fully opened. Such use of a current limitation mode could e.g. be useful in order to avoid damage to the converter 105 during the time required for the protection system to assess the situation, and/or to ensure that the current through the HVDC switchyard 1000 will be kept below the level above which the switchyard DC breakers 1010 of low speed will not be able to perform the breaking. In a fault situation wherein a protection system determines that the full opening of the fast DC breaker 500/1010L is not required, the partial opening of the fast DC breaker 500/1010L will save the power transmission system from the disturbances caused by breaking the DC current fully. The current limiting DC breaker 500/1010L of FIG. 5*c* is shown as an example only, and may be altered in many ways. For example, a current-limiting DC breaker 500/1010L could include any number N of breaker sections 925, where N>2. The series connection of 910 & 915 could be omitted from the breaker elements 925. If desired, instead of each breaker section 925 having its own auxiliary switch 915 and disconnector 910, one set of series connection of 910 & 915 could be provided in parallel with the entire series connection of N breaker sections 925.

The present invention should not be construed to be limited to the use of semiconductor DC breakers. Assuming for example that a mechanical DC breaker becomes available that has a breaking time $t_{DC}$ of 10 ms or less, such fast mechanical DC breaker could advantageously be used as a fast DC breaker 500/1010L.

Figure 6:
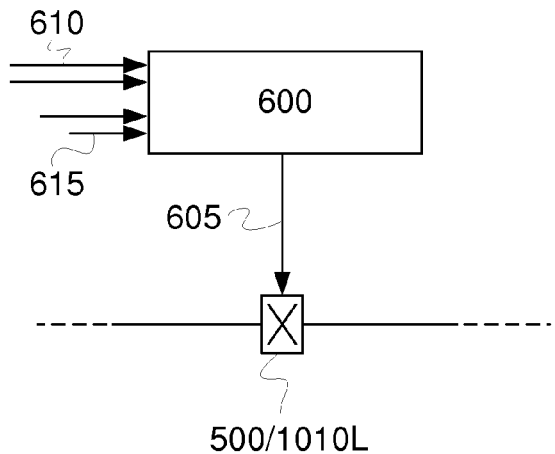
FIG. 6 is a schematic illustration of an HVDC station according to an embodiment of the invention.

Typically, an HVDC station 100 and/or an HVDC switchyard 1000 is equipped with a protection system, which is configured to perform measurements of various currents and voltages in order to determine whether any fault, which requires action, has occurred. An example of a protection system 600 arranged to control the tripping of a fast DC breaker 500/1010L by which a local HVDC station 100 or a part of an HVDC grid 400 is connected to an HVDC switchyard 1000 is shown in FIG. 6. Typically, a fast DC breaker 500/1010L should be tripped, in part or in full, upon occurrence of a major fault in a local HVDC station 100L in order to protect the HVDC grid 400 from fault currents caused by such fault. A fast DC breaker 500/1010L should also be tripped, in part or in full, upon occurrence of a major fault in a transmission line or in other equipment in the HVDC grid, including a fault in a busbar 1005 of the HVDC switchyard 1000, in order to protect the healthy parts of the HVDC grid 400. Whether a fault requires tripping or not could for example be determined, as will be seen below, by comparing the current through the fast DC breaker 500/1010L to a pre-defined value. Part tripping of a fast DC breaker 500/1010L can be performed if the DC breaker 500/1010L can operate as a current limiter, as is the case with the fast DC breaker comprising independently switchable breaker sections 925 as discussed in relation to FIG. 5*c*.

The protection system 600 is arranged to generate and send a trigger signal 605 to the fast DC breaker 500/1010L when an action of the fast DC breaker 500/1010L is required. Depending on the type of fast DC breaker 500/1010L, different actions of the fast DC breaker 500/1010L are possible, and hence, different trigger signals 605 can be generated in response to different indications in the HVDC grid.

Regardless of the design of the fast DC breaker 500/1010L, a disconnection trigger signal 605 should be sent upon detection of a fault that requires a disconnection of the local HVDC station 100L. A decision to disconnect the local HVDC station 100L could for example be based on external indications that a fault has occurred (external in relation to the fast DC breaker 500/1010L), for example based on results of temperature monitoring of the sensitive parts (e.g. diodes of the electric valves) in a local HVDC station; and/or based on a derivate protection; and/or based on a differential protection using current and/or voltage measurements on other parts of the HVDC grid than the fast DC breaker 500/1010L itself. A decision to disconnect could also be based on measurements of properties in the fast DC breaker 500/1010L itself, such as the temperature of a surge diverter 905, or the current through the fast DC breaker 500/1010L so that the current would be broken if approaching a level beyond which the fast DC breaker will not be able to perform a breaking operation.

If the fast DC breaker 500/1010L comprises a series connection of an auxiliary switch 915 and a disconnector 910, the protection system 600 could advantageously be arranged to send a pre-emptive trigger signal 605 to the fast DC breaker 500/1010L, in response to which the fast DC breaker 500/1010L is arranged to open the auxiliary switch 915 and the disconnector 915 (the opening being sequential), in order to make the fast DC breaker 500/1010L ready for a breaking operation of the main breaker 900. If the auxiliary switch 915 and the disconnector 910 have been opened already when a disconnection trigger signal 605 is received by the fast DC breaker 500/1010L, and the current thereby has already been commutated to the main breaker 900, the opening time of the fast DC breaker 500/1010L will be shorter. In order to determine whether a pre-emptive trigger signal 605 should be generated, the protection system 600 could be arranged to monitor the current situation in the fast disconnector 500/1010L itself, so that when a current in the fast disconnector 500/1010L rises above a pre-determined level, the pre-emptive trigger signal 605 will be generated. Hence, a decision to send a pre-emptive trigger signal 605 could advantageously be based on a fault indication that is detected internally in the fast DC breaker 500/1010L. The pre-determined level could for example lie above the current expected at normal operation but well below a current level at which a disconnection of the local HVDC station 100 would be required, for example in the range of 110-150% of the current expected at normal operation.

If the fast DC breaker 500/1010L comprises independently switchable breaker sections 925, the protection system 600 could advantageously be arranged to generate a limitation trigger signal 605 in response to an indication that it would be advantageous to limit the current through the fast DC breaker 500/1010L without actually breaking the current. The fast DC breaker 500/1010L would in this embodiment be arranged to trip a subset of the breaker sections 925 upon receipt of a limitation trigger signal 605 from the protection system 600. In order to determine whether a limitation trigger signal 605 should be generated, the protection system 600 could e.g. be arranged to monitor the current situation in the fast disconnector 500/1010L itself, so that when a current in the fast disconnector 500/1010L rises above a pre-determined level, the limitation trigger signal 605 will be generated. Hence, a decision to send a limitation trigger signal 605 could advantageously be based on a fault indication that is detected internally in the fast DC breaker 500/1010L. The pre-determined level could for example lie above the current expected during normal operation but still below a current level at which a disconnection of the local HVDC station 100 would be required, for example in the range of 110-150% of the current expected at normal operation. If the sectionalized fast HVDC breaker 500/1010L is equipped with an auxiliary switch, the opening of one or more sections 925 could, in one implementation, be performed as soon as the auxiliary switch 915 and disconnector 910 have been opened. By limiting the current through the fast DC breaker 500/1010L when the current rises above a comfortable level, rather than disconnecting the local HVDC station 100 by fully opening the fast DC breaker 500/1010L, the protection system 600 will be given more time to investigate whether or not the local HVDC station 100L actually has to be disconnected. In some cases, disconnection might not be required, in which case opened breaker sections 925 could be closed again, and the disturbances to the HVDC grid will have been considerably smaller than if the local HVDC station 100 had been disconnected.

Figure 7:
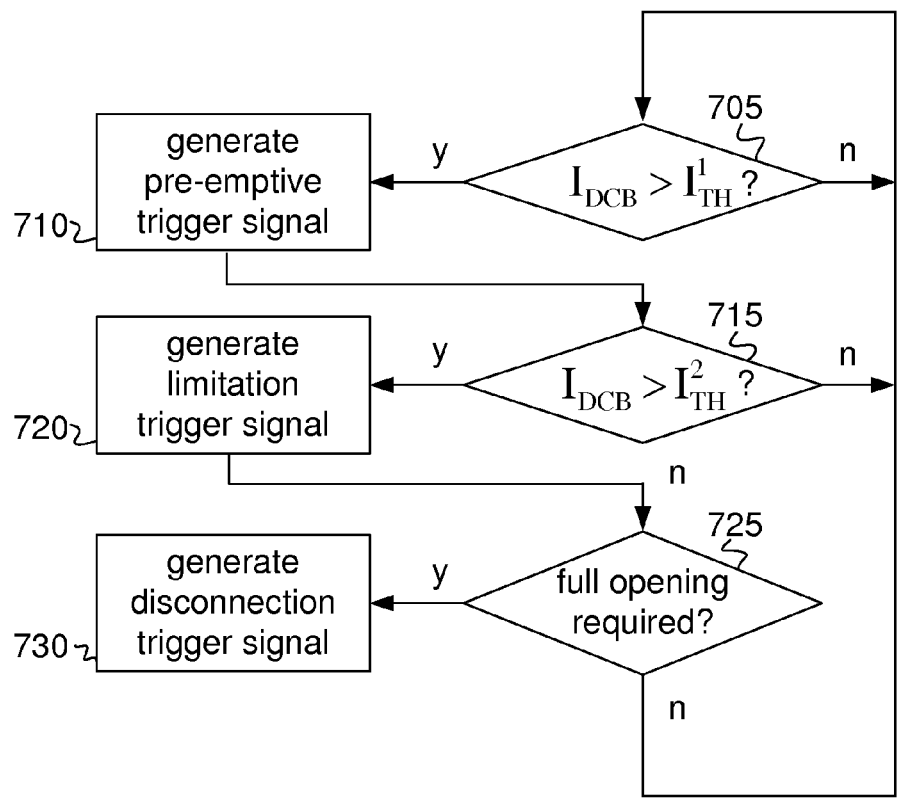
FIG. 7 is a flowchart schematically illustrating an embodiment of a method of controlling an embodiment of a fast DC breaker which connects a first HVDC station to an HVDC switchyard.

Hence, a fast DC breaker 500/1010L having independently switchable breaker sections 925 as well as a series connection of an auxiliary switch 915 and a disconnector 910, an example of which is shown in FIG. 5c, could be arranged to receive three different types of trigger signals 605, where each type will cause a different action in the fast DC breaker 500/1010L: Disconnection trigger signals; pre-emptive trigger signals and limitation trigger signals. The protection system 600 could further be arranged to generate other types of trigger signals. FIG. 7 is a flowchart illustrating an example of an embodiment of a method performed by a protection system 600 in relation to the control of a fast DC breaker 500/1010L having both independently switchable breaker sections 925 and a series connection of an auxiliary switch 915 and a disconnector 910. At step 705, it is checked whether a current in the fast DC breaker 500/1010L, $I_{DCB}$, exceeds a first current threshold $I_{TH}^1$, where the $I_{TH}^1$ is pre-defined to lie above the current expected during normal operation. If not, step 705 is re-entered, while if so, step 710 is entered, wherein a pre-emptive trigger signal 605 is sent to the fast DC breaker 500/1010L. Step 715 is then entered. In step 715, it is checked whether the current in the fast DC breaker 500/1010L, $I_{DCB}$, exceeds a second current threshold $I_{TH}^2$. $I_{TH}^2$ is a pre-defined threshold such that $I_{TH}^2 > I_{TH}^1$, while $I_{TH}^2$ still lies below a current threshold above which the fast DC breaker 500/100L needs to be opened. If it is found in step 715 that $I_{DCB}$ does not exceed $I_{TH}^2$, then step 705 is re-entered, while if found that $I_{DCB}$ does exceed $I_{TH}^2$, then step 720 is entered, wherein a limitation trigger signal 605 is generated. Step 725 is then entered. In step 725, it is checked whether a full opening of the fast DC breaker 500/1010L is required. If so, step 730 is entered, wherein a disconnection trigger signal 605 is generated. If not, step 705 is re-entered. The check of step 725 could include both a check of external indications indicating that the local HVDC station 100L should be disconnected, and a check of internal indications, internal to the DC breaker itself, such as the level of $I_{DCB}$, or the temperature of any open surge diverters 905. A third current threshold $I_{TH}^3$ level could for example be defined in order to ensure that the current through the fast DC breaker 500/1010L does not exceed a current level beyond which the fast DC breaker 500/1010L would itself be destroyed. Step 725 could also include a check of the time passed since current limitation was initiated, so that a full opening of the fast DC breaker 500/1010L will be performed if this amount of time exceeds a predetermined amount of time. Hence, the protection system 600 arranged to control the operation of a fast DC breaker 500/1010L could advantageously be arranged to use both internal information obtained from measurements of quantities in the fast DC breaker 500/1010L, such as current and/or temperature, and external information obtained from measurements of quantities in parts of the HVDC grid which are external to the fast DC breaker 500/1010L, such as currents, voltages and/or temperatures in the local HVDC station 100L, in the HVDC switchyard 1000, in the DC transmission lines 110 connected to the HVDC switchyard 1000 to which the fast DC breaker 500/1010L connects the local HVDC station 100L, etc. This is indicated in FIG. 6 by a set of internal input signals 610 and a set of external input signal 615. The different types of input signals in a set could be as low as one, or even zero, if only internal or external input signals are used.

The method shown in FIG. 7 is an example of a method of controlling a fast DC breaker 500/1010L, and an alternative method could be used. For example, the checks performed based on external information could be made independently on the checks performed based on internal information, rather than in the same sequence of events as shown in FIG. 7. Depending on the design of the fast DC breaker 500/1010L, steps 705-710 and/or steps 715-720 could be omitted. When both step 705-710 and step 720 are present, step 715 could be replaced by a delay, so that step 720 will automatically be entered after step 710, with a time delay suitable for the auxiliary switch 915 and disconnector 910 to open. When the fast DC breaker to be controlled by the method is an HVDC station breaker 500, the protection system 600 could be arranged to send, in step 730, a disconnection trigger signal to the switchyard breakers 1010 connecting the local HVDC station to the HVDC switchyard 1000.

The control of a switchyard DC breaker 1010 which is used to connect further HVDC stations 100 to the HVDC switchyard 1000 would typically be independent on the control of the fast DC breaker(s) 500/1010L. Such control could typically be based on protection techniques which use external information, such as differential protection or derivative protection.

The protection system 600 could, by use of suitable electrical circuitry, be implemented by means of hardware only. In one implementation of protection system 600, the protection system 600 is at least partly implemented by a processor and computer software to be run on the processor.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. An HVDC switchyard arranged to interconnect a first part of a DC grid with at least one further part of the DC grid, wherein the HVDC switchyard comprises:
    at least one busbar and at least two switchyard DC breakers; wherein:
        at least one of the at least two switchyard DC breakers, arranged to connect the first part of the DC grid to the at least one busbar, is a fast DC breaker;
        at least one of the switchyard DC breakers is of lower speed, said at least one lower speed switchyard DC breaker being arranged to interconnect a further part of the DC grid with at least one of the at least one busbar; and
        the fast DC breaker is capable of providing a higher breaking speed than the at least one DC breaker of lower speed.

2. The HVDC switchyard of claim 1, wherein the first part of the DC grid is a single HVDC station, and the at least one further part of the DC grid comprises at least one further HVDC station.

3. An HVDC switchyard system arranged to interconnect a first HVDC station with at least one further HVDC station, the HVDC switchyard system comprising the first HVDC station and an HVDC switchyard, wherein the HVDC switchyard comprises:
    at least one busbar and at least one switchyard DC breaker for interconnecting the first HVDC station with the at least one further HVDC station; and wherein
    the first HVDC station is connected to the at least one busbar via at least one fast DC breaker capable of providing a higher breaking speed than the at least one switchyard DC breaker, which is of lower speed and which interconnects at least one of the at least one further HVDC station with at least one of the at least one busbar.

4. The switchyard arrangement of claim 3, wherein said at least one fast DC breaker is a switchyard DC breaker.

5. The switchyard arrangement of claim 2, wherein any switchyard DC breaker arranged to be connected in series between the first HVDC station and one of said at least one busbar is a fast DC breaker.

6. The switchyard arrangement of claim 3, wherein said at least one high speed DC breaker forms part of the first HVDC station.

7. The switchyard arrangement of claim 1, wherein any switchyard DC breaker arranged to connect a further part of the DC grid, which is a further HVDC station, to any busbar is a DC breaker of lower speed.

8. The switchyard arrangement of claim 1, wherein a fast DC breaker is a power electronic DC breaker while a switchyard DC breaker of lower speed is a mechanical DC breaker.

9. The switchyard arrangement of claim 1, wherein the breaking speed of the fast DC breaker is in the order of twice, or more, of the breaking speed of the at least one switchyard DC breaker of lower speed.

10. The switchyard arrangement of claim 1, wherein the breaking time of the at least one fast DC breaker is 10 ms or less.

11. The switchyard arrangement of claim 1, wherein the fast DC breaker comprises:
    a main semiconductor switch of turn-off type;
    a surge diverter connected in parallel with the main semiconductor switch; and
    a series connection of a high speed switch and an auxiliary semiconductor switch of turn-off type, wherein the series connection is connected in parallel to the main semiconductor switch and the surge diverter.

12. The switchyard arrangement of claim 1, wherein the fast DC breaker comprises a series connection of at least two independently switchable breaker sections, so that the fast DC breaker could operate as a current limiter.

13. The switchyard arrangement of claim 1, wherein the HVDC switchyard is of one of the following configurations:
    one and a half breaker configuration;
    two breaker/two busbar configuration; or
    ring bus configuration.

14. The switchyard arrangement of claim 1, further comprising a protection system configured to control the operation of the fast DC breaker(s) so that the fast DC breaker(s) will open in response to the detection of a fault.

15. A DC grid comprising the switchyard arrangement of claim 1.

16. The switchyard arrangement of claim 4, wherein any switchyard DC breaker arranged to be connected in series between the first HVDC station and one of said at least one busbar is a fast DC breaker.

17. The switchyard arrangement of claim 2, wherein any switchyard DC breaker arranged to connect a further part of the DC grid, which is a further HVDC station, to any busbar is a DC breaker of lower speed.

18. The switchyard arrangement of claim 3, wherein any switchyard DC breaker arranged to connect a further part of the DC grid, which is a further HVDC station, to any busbar is a DC breaker of lower speed.

19. The switchyard arrangement of claim 4, wherein any switchyard DC breaker arranged to connect a further part of the DC grid, which is a further HVDC station, to any busbar is a DC breaker of lower speed.

20. The switchyard arrangement of claim 5, wherein any switchyard DC breaker arranged to connect a further part of the DC grid, which is a further HVDC station, to any busbar is a DC breaker of lower speed.

21. The switchyard arrangement of claim 3, wherein the fast DC breaker comprises:
- a main semiconductor switch of turn-off type;
- a surge diverter connected in parallel with the main semiconductor switch; and
- a series connection of a high speed switch and an auxiliary semiconductor switch of turn-off type, wherein the series connection is connected in parallel to the main semiconductor switch and the surge diverter.

* * * * *